US006966791B1

(12) United States Patent
Farr

(10) Patent No.: US 6,966,791 B1
(45) Date of Patent: Nov. 22, 2005

(54) CABLE STORAGE DEVICE

(76) Inventor: Phillip G. Farr, 104 Cobb St., Thomson, GA (US) 30824

( * ) Notice: Subject to any disclaimer, the term of this patent is extended or adjusted under 35 U.S.C. 154(b) by 71 days.

(21) Appl. No.: 10/184,275

(22) Filed: Jun. 27, 2002

Related U.S. Application Data

(60) Provisional application No. 60/301,607, filed on Jun. 27, 2001.

(51) Int. Cl.⁷ ............................................. H01R 13/62
(52) U.S. Cl. ....................... 439/367; 206/702; 206/303; 206/408
(58) Field of Search ............................. 206/303, 320, 206/408, 409, 576, 701, 719, 720, 721; 361/212, 361/683; 174/35 C; 439/367

(56) References Cited

U.S. PATENT DOCUMENTS

| | | | |
|---|---|---|---|
| 3,310,623 A | | 3/1967 | Vaughan |
| 3,585,275 A | * | 6/1971 | Gillemot et al. .............. 174/76 |
| D278,095 S | | 3/1985 | Werner |
| 4,650,073 A | * | 3/1987 | Young ........................ 206/409 |
| 4,731,029 A | | 3/1988 | Lerner et al. |
| 4,846,343 A | * | 7/1989 | Rupert ....................... 206/303 |
| 4,858,846 A | | 8/1989 | McDonald |
| 4,869,683 A | * | 9/1989 | Nelson ....................... 439/369 |
| 4,936,700 A | * | 6/1990 | Morris ....................... 401/196 |
| 4,944,694 A | | 7/1990 | Dorn |
| 4,979,614 A | | 12/1990 | Ruhaut |
| 4,984,685 A | | 1/1991 | Douglas |
| 5,109,983 A | * | 5/1992 | Malone et al. .............. 206/408 |
| 5,314,070 A | * | 5/1994 | Ciarlei ....................... 206/570 |
| 5,596,479 A | | 1/1997 | Campbell et al. |
| 5,669,571 A | * | 9/1997 | Graybill ................... 242/378.1 |
| 5,924,892 A | | 7/1999 | Ferracina |
| 6,026,961 A | | 2/2000 | McCarthy et al. |
| 6,250,578 B1 | * | 6/2001 | Manda .................... 242/378.1 |
| 6,289,896 B1 | * | 9/2001 | Hart ............................ 128/897 |
| 6,357,001 B1 | * | 3/2002 | Brower et al. ................. 713/1 |
| 6,520,325 B1 | * | 2/2003 | Simpson ..................... 206/303 |

* cited by examiner

*Primary Examiner*—David T. Fidei
(74) *Attorney, Agent, or Firm*—Carter Schnedler & Monteith, P.A.

(57) ABSTRACT

A device for storing computer cables, including a body portion, a lid portion, an optional electrically conductive shield, and a closure for fastening the body and lid portions in a closed position. The body portion includes at least one circumferential channel for storing a cable; the ends of the cable may extend outwards through openings in the device. The device may also include compartments and pockets for storing small accessory items.

8 Claims, 3 Drawing Sheets

CABLE STORAGE DEVICE

This application claims priority of Provisional Application No. 60/301,607 filed Jun. 27, 2001.

BACKGROUND OF THE INVENTION

1. Field of the Invention

The present invention relates to a device for storage and organization of power cords, cables, and interconnects. In particular, the present invention relates to a cable storage device for use in conjunction with a personal computer and associated peripherals. The invention also relates to an EMI-shielded cable storage device.

2. Discussion of Background:

Personal computers (desktops, laptops, notebooks, handheld organizers) are becoming increasingly prevalent: current estimates indicate that most US residents either own or have access to at least one personal computer. In addition to the computer itself, a computer system, whether intended for home or business use, includes peripheral devices such as printers, scanners, CD-ROM, DVD-ROM, and CD-RW drives, digital cameras, external storage devices, modems, telephone jacks, input devices such as mice or trackballs, and docking stations or port replicators, each device with its own cables, connectors, and (if needed) converters. Laptop and notebook users in particular tend to transport their computers and associated peripherals wherever they need to work. In fact, many people use their laptops or notebooks as their only computer, transporting their computers daily between their homes and workplaces.

Virtually all computer systems have power cords and cables of varying lengths (for purposes of this specification, the terms "cord," "cable," and "interconnect" are used interchangeably). Cables used for personal computer systems (desktops and laptops) are usually relatively short, ranging from about 2' to about 6' in length (about 0.6–1.8 m), whereas network cables are typically provided in standard lengths such as 25' or 50' (about 7.6 m or 15.2 m, respectively). The longer the cables, the more difficult it is to organize them neatly. Thus, the cables usually end up being stored behind the user's desk or workstation where they frequently become tangled and (without following each cable from one end to the other) hard to identify. Because the mass of haphazardly stored cables is difficult to clean properly, the cables tend to accumulate dust which can exacerbate allergies in susceptible persons.

Portable computers such as laptops, notebooks, and the increasingly-popular handheld organizers are connected to peripheral devices during at least part of the time that they are in use. These devices also have cables which must be stored—somewhere—and only add to workplace clutter. In addition, users of portable computers face the problem of setting up their systems, disassembling the systems, and storing and transporting all the components needed for their systems on a regular basis. Computer carrying cases have compartments for storing a portable computer and (sometimes) peripheral devices as well. However, typical computer cases do not allow the user to organize these devices and associated cables, and keep them organized during use and transportation. Thus, packing and unpacking the equipment, sorting out the cables, and connecting and disconnecting the cables contributes to system downtime and user frustration.

Storage devices for power cords and related equipment are available to consumers. Storage devices for computer cables includes those disclosed by McCarthy, et al. (U.S. Pat. No. 6,026,961) and Ferracina (U.S. Pat. No. 5,924,892). The McCarthy, et al. device consists of a zippered organizer pack for storing and dispensing computer cords and other supplies. The pack, which is small enough to fit into a laptop carrying case, has pockets, keepers for organizing cords, a VELCRO strip for attaching a power supply, and openings at the sides for the ends of the cords. Ferracina provides a box-like case having an outlet strip and retainers with covers for arranging electrical cables. In one embodiment, the case has a flat, hinged support to which the user can attach a transformer or other items.

Campbell, et al. (U.S. Pat. No. 5,596,479) provide a device with switches that allow the user to power selected components of a desktop computer system. The device includes a hard-sided case with several electrical sockets and storage space for coiling the excess portions of the various power cords.

McDonald (U.S. Pat. No. 4,858,846) provides a wiring harness for removing the slack from electrical cables. The device has several U-shaped cutouts along the sides, with corresponding telescoping guides attached to the container floor. The excess length of a cable can be wrapped about one of the guides.

A variety of other types of containers are available for electrical wiring, extension cords, audio cable, and other elongated items such as hoses. For example, Douglas (U.S. Pat. No. 4,984,685) shows a portable container for storing extension cords, hoses, wire, etc. The container includes a bucket with a central shaft, and a lid that has a opening aligned with the shaft. The cord is inserted into the bucket and wrapped around the shaft for storage; the shaft may be hollow to provide storage space for various accessories.

Ruhaut's storage container (U.S. Pat. No. 4,979,614) can be used for electrical cords or umbrellas. The electrical cord is folded manually and inserted into the container, where is it retained by a spring or bellows. A VELCRO strip attached to the container allows it to be mounted to a wall or other surface.

Dorn (U.S. Pat. No. 4,944,694) provides an electric cord take-up device consisting of a container having a plurality of upstanding pegs on the base. Wires enter and exit the container through a series of cutouts on one of its sides, and can be wrapped about the pegs in many different arrangements. Lerner, et al. (U.S. Pat. No. 4,731,029) discloses a wire and cable manager having a storage tray for organizing excess lengths of cable, and an outlet strip for supplying power to the cables. The cables appear to be simply coiled inside individual compartments formed in the tray.

Vaughan's extension cord storage means (U.S. Pat. No. 3,310,623) consists of a hollow tube with concave sides and rounded corners. This configuration is said to help retain a folded extension cord inside the tube. Werner (U.S. Des. 278,095) shows a flexible storage container with three openings.

Another problem associated with cables is found with all electronic equipment, that is, the effects of interference (electromagnetic interference ("EMI") and radiofrequency interference ("RFI")). The term EMI usually refers to interference that is generated inside the system; RFI refers to interference coming from sources outside the system. In order to ensure proper performance, sensitive electronic equipment must be shielded from EMI and RFI. Most commercial electronic equipment, including computers, cables, and peripheral devices (scanners, printers, modems, external storage devices, docking stations, etc.), is a source of EMI and RFI. Shielding and grounding individual circuit boards within an electronic device helps control internal interference, and also helps minimize interference from external sources. Network cables are frequently shielded, and modem and speaker wires usually do not carry sufficient amperage to contribute significantly to interference problems. However, for sensitive applications, shielded cables can help reduce the effects of interference, thereby making the difference between optimal and sub-optimal operations. Even without shielding, many a computer user can attest that an apparent equipment malfunction was "fixed" simply by separating adjacent cables to reduce interference.

Despite the availability of a variety of power cord storage devices, no known device is simple and easy to use, allows the user to easily connect and disconnect the cables without unpacking them, and optionally has the capability of protecting its contents from the potentially deleterious effects of EMI and RFI. There remains a need for such a device.

SUMMARY OF THE INVENTION

According to its major aspects and broadly stated, the present invention is a device for storing computer cables in a configuration that allows the user to quickly and easily connect and disconnect the cables without unpacking. The device includes a body portion, a lid portion, and a closure for fastening the body and lid portions together in a closed position. The body portion includes at least one compartment for storing a coiled or bunched-up cable; for connection to a computer system, the ends of the cable may be extended outwards through openings in the device. The device may also include compartments and pockets for storing small accessory items. In one embodiment of the invention, the device also includes an electrically conductive shield that protects the contents against EMI and RFI interference.

A device according to the present invention can be used with a wide variety of electrical equipment, including but not necessarily limited to computer equipment (personal computers, routers, web hosting computers, network computers, etc.). The device makes it easier to transport and install the cables needed for portable computer systems such as laptops and notebooks, since the cables need not be unpacked and rearranged every time the system is moved. The device also reduces workplace clutter and facilitates cleaning, thereby providing potential health benefits in the form of a reduction in dust-borne allergens.

An important feature of the present invention is the body portion of the device, wherein the cable (or cables) are stored. The body portion has at least one, and preferably a plurality, of compartments for storing cables. In one embodiment of the invention, the body portion includes at least one circumferential channel or spool, and at least one pair of transverse channels. Cables are coiled for storage in the circumferential channels, with the cable ends being extendable outwards through the transverse channels for quick and easy connection to a computer, telephone jack, and power source. In another embodiment, the body portion has at least one compartment for storing coiled or bunched-up cables which are held by a twist-tie or other fastener. If desired, the body portion may carry a hook, VELCRO or other hook-and-loop fabric, or some other type of fastener for mounting the device to a wall; it may also include a compartment for storing small accessories (screwdrivers, pens, etc.).

Another feature of the present invention is the lid portion of the device, which together with the body portion retains the cables in position for use. The lid portion may carry indicia such as a logo, the user's name or other identifying indicia, or indicia that identify the computer equipment with which the device is used. It may also include additional storage such as interior pockets, a VELCRO strip for attachment of accessories having suitable mating fabrics, and so forth.

Still another feature of the present invention is the shield. If present, the shield is preferably grounded when the device is in use, and helps protect the contents of the device against interference. The shield is made of a flexible, conformable, electrically-conductive material that is effective in providing EMI and RFI shielding. It may take the form of a lining attached to the inside of the device, or an interior flap that covers cables stored in the body when the device is closed. Woven or nonwoven fabrics of nylon or polyester, with suitable electrically-conductive coatings, are broadly suitable for use with the invention. In a preferred embodiment, the fabrics have a far-field shielding effectiveness of at least approximately 70 dB at 100 MHz.

Other features and advantages of the present invention will be apparent to those skilled in the art from a careful reading of the Detailed Description of Preferred Embodiments presented below and accompanied by the drawings.

DETAILED DESCRIPTION OF PREFERRED EMBODIMENTS

Figure 1:
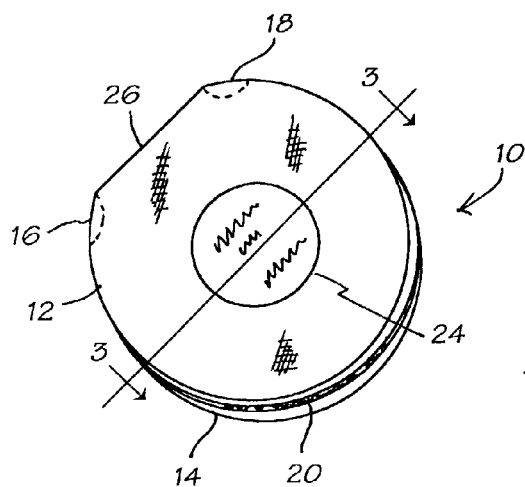
FIG. 1 is a perspective view of a cable storage device according to a preferred embodiment of the present invention in a closed configuration.

In the following detailed description of the invention, reference numerals are used to identify structural elements, portions of elements, surfaces or areas in the drawings, as such elements, portions, surfaces or areas may be further described or explained by the entire written specification. For consistency, whenever the same numeral is used in different drawings, it indicates the same element, portion, surface or area as when first used. Unless otherwise indicated, the drawings are intended to be read together with the specification, and are to be considered a portion of the entire written description of this invention as required by 35 U.S.C. § 112. As used herein, the terms "horizontal," "vertical," "left," right," "up," "down," as well as adjectival and adverbial derivatives thereof, refer to the relative orientation of the illustrated structure as the particular drawing figure faces the reader.

Figure 2:
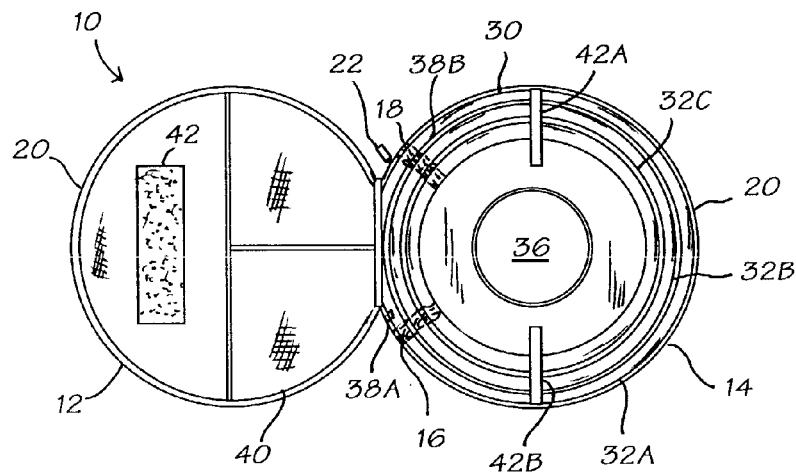
FIG. 2 is a perspective view of the device of FIG. 1 in an open position.
Figure 3:
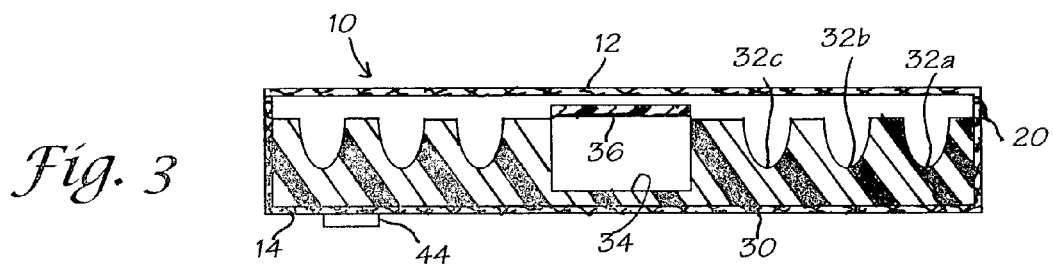
FIG. 3 is an enlarged, cross-sectional view along the line 3—3 of FIG. 1.

Referring now to FIGS. 1–3, there is shown a cable storage device 10 according to a preferred embodiment of the present invention. Device 10 has a top portion or lid 12, a bottom portion or body 14, and two side openings 16, 18 positioned at the ends of a closure 20. Closure 20 may be a zipper with a zipper tab 22. Alternatively, closure 20 may be a bead-and-groove closure with the bead on lid 12 and the corresponding groove on body 14 (or vice versa). Other suitable closures include hook-and-loop fabrics such as VELCRO, snap fasteners, and so forth. Lid 12 and body 14 are made of sturdy, durable materials, such as canvas or nylon fabric, vinyl or other plastic sheeting, and the like. Lid 12 and body 14 may be integrally formed, sewn or bonded together at a seam 26, or attached to each other by other suitable techniques.

Lid 12 may carry a label 24, which may be permanently attached to the lid, or which may be removable and replaceable by the user. Label 24, if present, may carry any selected decorative or informational indicia. For example, the label may carry identifying indicia such as the user's initials (or other data), a manufacturer's name or logo, or information about the computer equipment (and/or other equipment) with which device 10 is used. Label 24 and/or device 10 may be color-coded to help the user identify the corresponding equipment, particularly when more than one device 10 is used in the same general location. Alternatively, label 24 may have an erasable surface so that the user can quickly change the recorded information without having to replace the label.

An insert 30 in body 14 may have a plurality of circumferential channels 32a, 32b, 32c and an optional central compartment 34 formed therein. In another preferred embodiment, at least one of channels 32a, 32b, 32c contains a spool on which a cable or cables can be wound. Alternatively, insert 30 has one or more compartments dimensioned for holding coiled or bunched-up cables.

Lid 36 (preferably a snap-on lid) covers compartment 34; lid 36 may be separate from compartment 34, or may be attached thereto by a "living hinge" or other suitable device. At least one pair of transverse channels 38a, 38b extend from innermost channel 32c to openings 16, 18, respectively. Insert 30 is made of a durable, electrically-insulating (i.e., nonconducting) material, for example, molded plastic. Suitable plastics include polyvinyl chloride, polyethylene, fluorocarbon resins, nylon, reinforced plastics, and others known in the art.

An interior pocket or pockets 40 may be attached to the inside surface of top 12, together with a VELCRO-type fastener 42 for attaching a power converter, transformer, or other device that carries a suitable fabric that mates with fastener 42. Pockets 40 may be closed by VELCRO tabs, snaps, or other suitable closures if desired. Pockets 40 (if present) and compartment 34 may be used to store small accessories, tools, and other supplies.

If desired, two or more tabs 42a, 42b (attached to body 14 or insert 34) may be provided to help retain cables in channels 32a, . . . . Tabs 42a, 42b, if present, are secured to insert 30 near compartment 34 by snaps, VELCRO fasteners, or other suitable means. Device 10 may also include a hook or other suitable device (indicated schematically as 44, FIG. 3) for mounting the device to a wall or otherwise.

Figure 4:
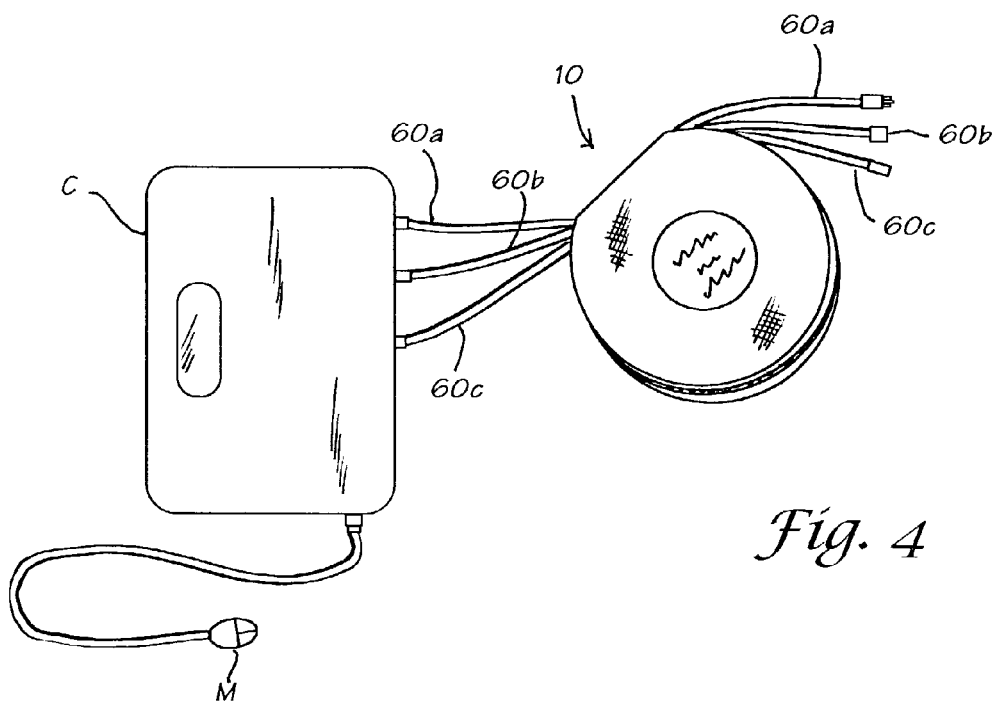
FIG. 4 is a perspective view of the device of FIG. 1, showing the device connected to a portable computer.

The user's cables and other small computer accessories such as a mouse M are stored in device 10, with the cables coiled in channels 32a, 32b, 32c (FIG. 4). The ends of cables 60a, 60b, 60c rest in channel 38a and extend through opening 16 to a portable or notebook computer C. The other ends of the cables rest in channel 38b and extend through opening 18. The user can place device 10 in any convenient location, extend only as much of the length of cables 60a, 60b, . . . as needed, plug in the cables, and start working with computer C. When he or she is ready to move the computer, all that is needed is to unplug the cables and return them to their fully-stored positions inside device 10. If device 10 is to be used with a permanent or semipermanent setup such as a router or a desktop computer, the user may choose to secure the device to a wall or other convenient location via hook 44.

Figure 5:
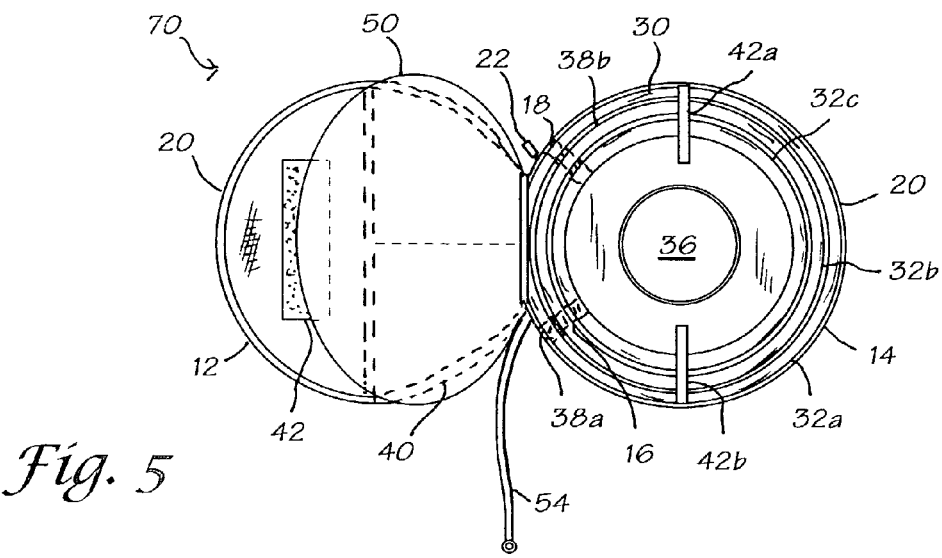
FIG. 5 is a perspective view of a cable storage device according to another preferred embodiment of the present invention, in an open position.
Figure 6:
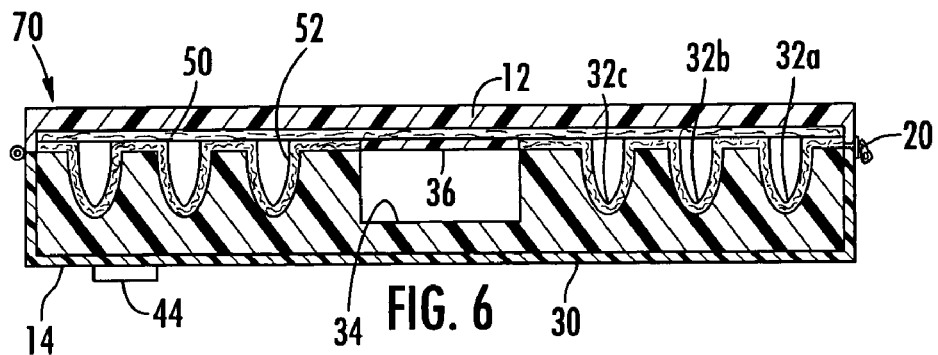
FIG. 6 is an enlarged, cross-sectional view of the device of FIG. 5.

A cable storage device 70 according to another preferred embodiment of the present invention is shown in FIG. 5. Like above-described device 10, device 70 has a top portion or lid 12, a bottom portion or body 14, and two side openings 16, 18 positioned at the ends of a closure 20 (a zipper with a zipper tab 22, a bead-and-groove closure, or some other suitable type of closure). Lid 12 may, if desired, carry a label 24. Device 70 also includes an insert 30, optional interior pocket or pockets 40, and optional tabs 42a, 42b. Device 70 may also include a hook or other suitable device (indicated schematically as 44) for mounting the device to a wall or otherwise.

A liner 50 is attached to lid 12, body 14, or seam 26. Liner 50 may be a flap as shown in FIG. 5; alternatively, liner 50 may be attached to the inside surface of lid 12, in which case pockets 40 and tabs 42a, 42b may be omitted. Similarly, a liner 52 is attached to body 14 and/or insert 30; liner 52 is electrically connected to liner 50. Liners 50, 52 form a shield that helps protect cables stored in device 70 from the potentially deleterious effects of EMI and RFI interference.

Liners 50, 52 are made of a flexible, conformable material that is effective in providing EMI and RFI shielding, for example, metallized fabric or metallized plastic sheeting. Woven or nonwoven fabrics of nylon, polyester, and other materials with electrically-conductive coatings are broadly suitable for use with the invention. Smooth weaves such as ripstop, taffeta, and tabby are preferred; however, knitted fabrics that maintain their shape without curling at the edges may also be useful. Liners 50, 52 may also be provided by coating any or all of the inner surfaces of lid 12, and body 14 (and/or insert 30) with metallic paint. The optimum type of liners 50, 52 are best determined by a modest amount of experimentation for each particular application.

Liners 50, 52 may be made of any electrically-conductive material. Coatings that include copper, nickel, and alloys thereof are useful due to their corrosion resistance and high electrical conductivity. Thin fabrics or sheeting (as little as 0.005 in. (about 0.1 mm or thereabouts) thick) with a basis weight of 1.0–5.0 oz/yd (about 0.03–0.16 kg/m), a metal content of 0.2–2.0 oz/yd (about 0.008–0.08 kg/m$^2$), and a low surface resistivity are generally suitable for use with the invention. These types of fabrics tend to have a far-field shielding effectiveness of at least approximately 70 dB at 100 MHz, with somewhat lower effectiveness at higher frequencies. However, fabrics with properties outside these ranges may also be useful.

Device 70 preferably includes a ground connector 54 (shown in FIG. 5), which is electrically connected to one or both of liners 50, 52. Connector 54 can be attached to any suitable ground connection by the user of device 10 (as noted above, the shield formed by liners 50, 52 is preferably grounded during use of device 70).

The user's cables and other small computer accessories such as a mouse M are stored in device 70 in the same manner as in above-described device 10, with the cables coiled in channels 32a, 32b, 32c. The ends of the cables rest in channel 38a and extend through opening 16 to a portable or notebook computer C, generally as shown in FIG. 4 for device 10. The other ends of the cables rest in channel 38b and extend through opening 18. The user can place devices 10 or 70 in any convenient location, extend only as much of the length of cables 60a, 60b, . . . as needed, plug in the cables, and start working with computer C. When he or she is ready to move the computer, all that is needed is to unplug the cables and return them to their fully-stored positions inside the device. If device 70 is to be used with a permanent or semipermanent setup such as a router or a desktop computer, the user may choose to secure the device to a wall or other convenient location via hook 44.

Figure 7:
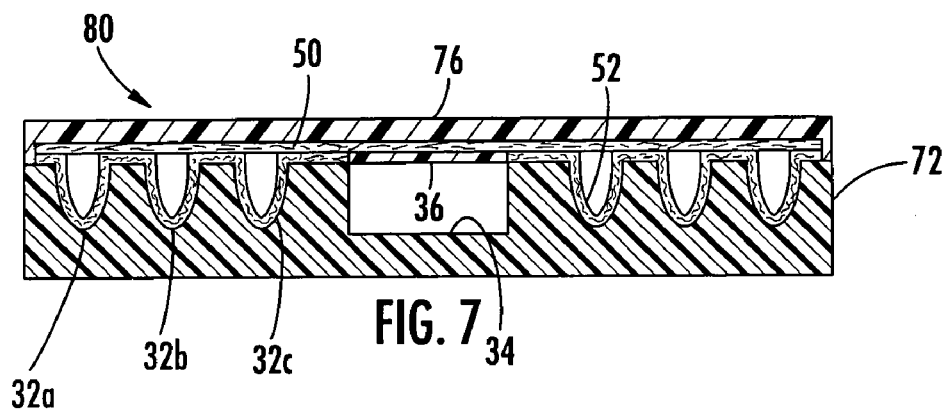
FIGS. 7 and 8 are enlarged, cross-sectional views of additional cable storage devices according to the present invention.

Another preferred embodiment of the present invention is shown in FIG. 7. A device 80 included a molded plastic body 72 with a lid 76 and a cover 50. Body 72, like above-described insert 30, has a plurality of circumferential channels such as 32a, 32b, 32c with transverse channels 38a, 38b, a compartment 34, and a lid 36. In this embodiment, lid 76 is a snap-type or clamshell-type lid which may be attached to body 72 by one or more hinges, living hinges, or other suitable means. The inner surface of body 72 may be lined with the same type of material as cover 50. If device 80 is to be used in applications where shielding is not needed, cover 50 may be omitted.

Figure 8:
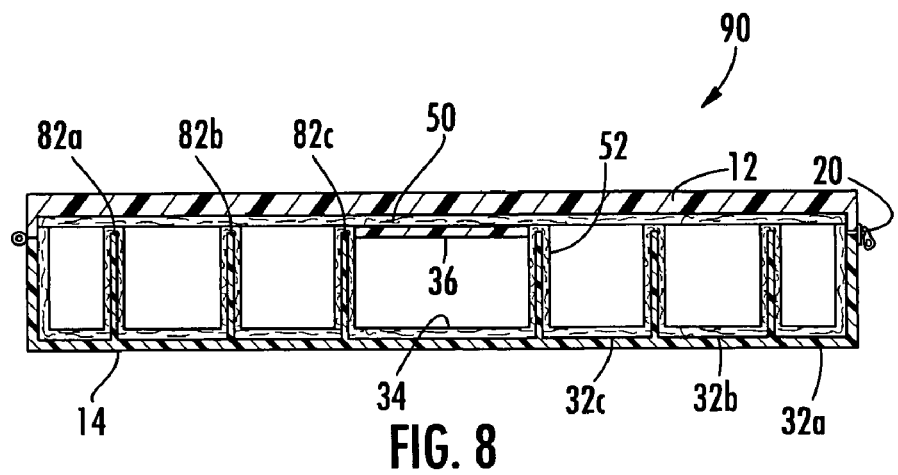

Still another device 90 according to the present invention is shown in FIG. 8. Like above-described devices 10, 70, and 80, device 90 has a body portion 14, a top or lid portion 12, optional liners 50 and 52, a ground connector 54 (not shown), and a closure 20 (a zipper, bead-and-groove closure, or some other convenient type of closure that is capable of holding the lid and body portions in a closed position). Body portion 14 carries generally vertical walls such as 82a, 82b, 82c which may be made of the same type of material as portions 12, 14, and are lined with a liner 52 generally as shown. Central compartment 34 (which may be provided with a lid 36 if desired) can be used to store small accessories, bunched-up cables, etc.

Devices 10, 70, 80, and 90 can be used with a wide variety of electrical equipment, including but not limited to computer equipment. For example, the devices can be used with personal computers (including desktop computers, notebooks, laptops, etc.), routers, web hosting computers, network computers, workstations, etc. The devices make it easier to transport and install the cables needed for portable computer systems such as laptops and notebooks. Some applications may require several devices 10, 70, 80, and 90 to accommodate all the cables that need to be stored neatly. For these applications, label 24 allows the user to quickly and easily tag the cables (and the particular device 10, 70, 80, and 90 used with those cables) for later identification.

The shapes and dimensions of devices 10, 70, 80, and 90 may vary depending on the particular application. While devices 10, 70, 80, and 90 are illustrated in the Figures as being generally round, the devices may be oval or some other shape that is useful for storing coiled cables (for example, oval configurations may be useful for storing longer cables). Furthermore, devices 10, 70, 80, and 90 help reduce clutter and facilitate routine cleaning, providing esthetic benefits and potential health benefits in the form of a reduction in dust-borne allergens.

With respect to the above description of the invention, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, it will be apparent to those skilled in the art that many changes and substitutions can be made to the preferred embodiment herein described without departing from the spirit and scope of the present invention as defined by the appended claims.

What is claimed is:

1. A cable storage system, comprising:
   a cable storage device comprising
      a body defining a cable storage area;
      a lid configured to substantially block or provide access to the cable storage area, as desired;
      a plurality of concentric channels defined by the body in the cable storage area or by an insert carried in the cable storage area, each of the channels configured to receive at least one cable;
      a plurality of openings defined by the body and through which cables may extend out of the body; and
   a cable entering into the cable storage device through one of the plurality of openings defined by the body, the cable extending through at least one of the plurality of concentric channels defined by the body and exiting the cable storage device through the entry opening or through another of the plurality of openings defined by the body.

2. A cable storage system according to claim 1, wherein at least one of the channels carries a spool on which a cable may be wound.

3. A cable storage system according to claim 1, further comprising a tab to help retain cables in the channels.

4. A cable storage system according to claim 1, wherein the body or the insert defines at least one compartment configured to receive at least one cable.

5. A cable storage system according to claim 1, wherein the lid is integrally formed with the body.

6. A cable storage system according to claim 1, wherein the lid is hinged on the body.

7. A method for storing cables, comprising:
   providing a cable storage device, the cable storage device comprising a body defining a cable storage area a lid configured to substantially block or provide access to the cable storage area, as desired, a plurality of concentric channels defined by the body in the cable storage area or by an insert carried in the cable storage area, each of the channels configured to receive at least one cable, and a plurality of openings defined by the body and through which cables may extend out of the body;
   opening the lid of the cable storage device to provide access to the cable storage area;
   inserting a cable into the cable storage device through one of the plurality of openings in the body of the cable storage device;

first extending the cable through at least one of the plurality of concentric channels defined by the body of the cable storage device;

then extending the cable out of the cable storage device through the entry opening or through another of the plurality of openings defined by the body of the cable storage device; and closing the lid of the cable storage device to block access to the cable storage area.

8. A method for storing cables according to claim 7, wherein:

a tab to help retain the cable in the at least one channel is provided in said providing step;

before said first extending step, said method further comprises positioning the tab to provide access to the channels; and after said first extending step, said method further comprises positioning the tab to help retain the cable in the at least one channel.

* * * * *